Nov. 20, 1951     A. H. McCALLUM ET AL     2,575,968
MOVABLE MACHINE MOUNTING
Filed Aug. 3, 1950     2 SHEETS—SHEET 1
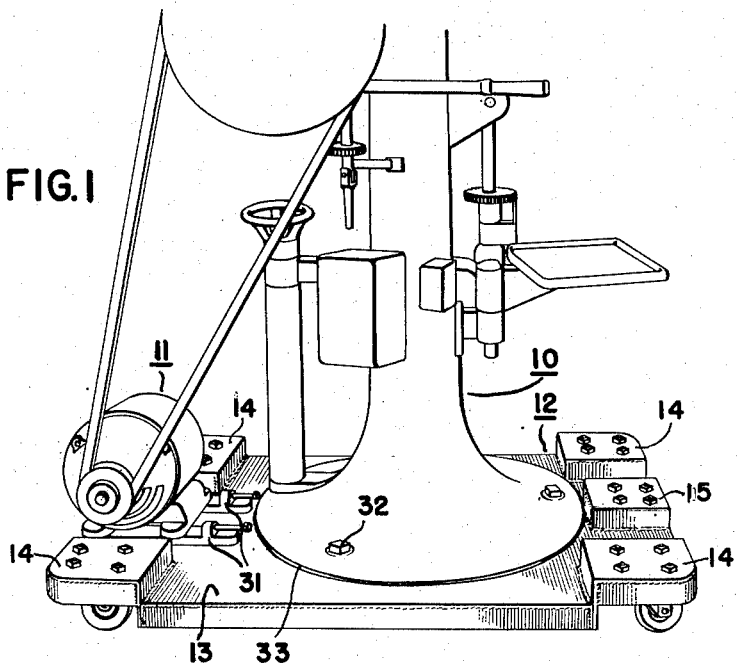
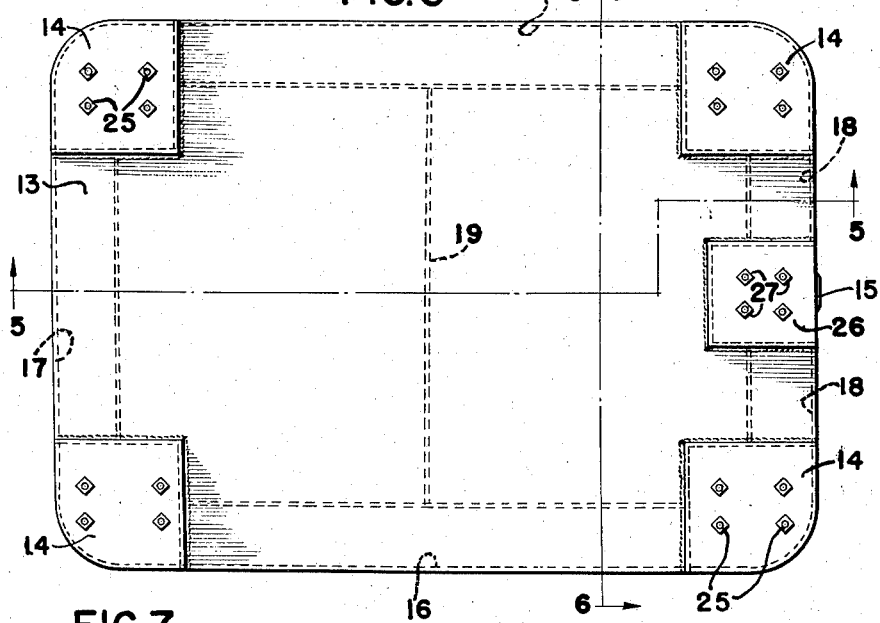
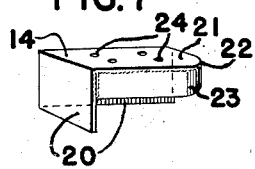
INVENTORS.
Archie H. McCallum
Ralph C. Breckenridge
Jay B. Case
BY *Lancaster, Allwine & Rommel*
ATTORNEYS.

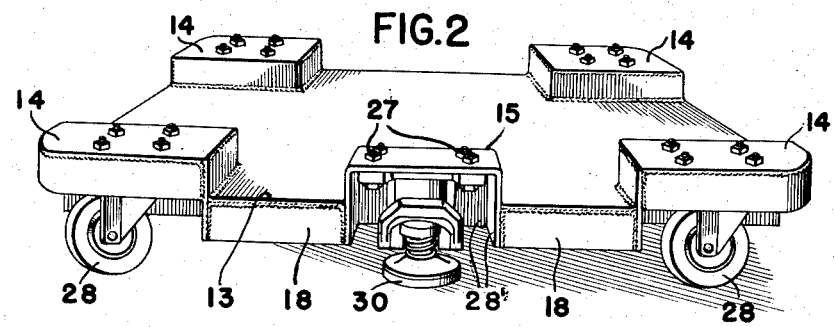
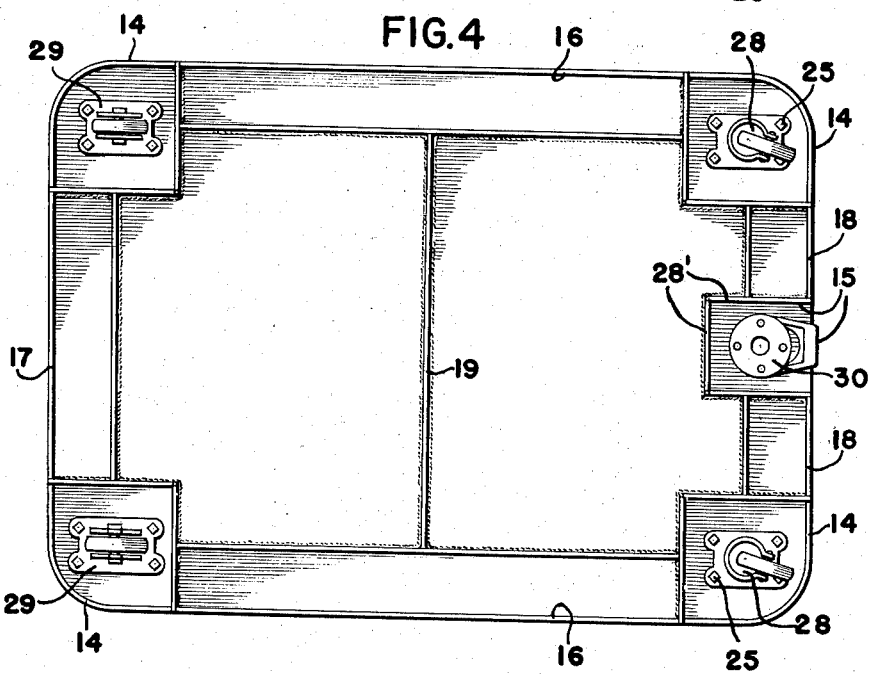
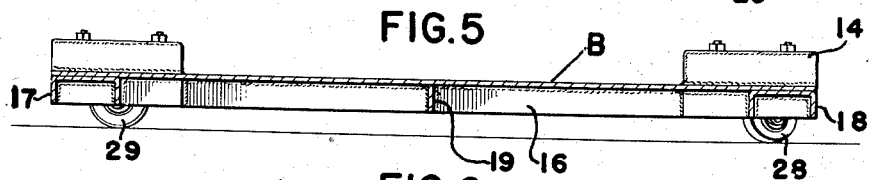
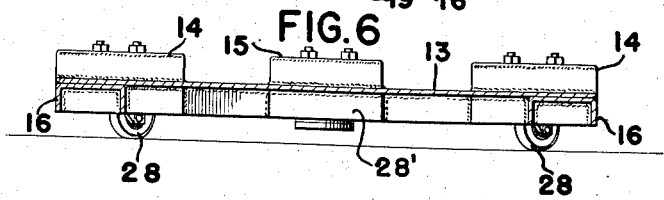
INVENTORS.
Archie H. McCallum
Ralph C. Breckenridge
Jay B. Case
ATTORNEYS.

Patented Nov. 20, 1951

2,575,968

UNITED STATES PATENT OFFICE 2,575,968

MOVABLE MACHINE MOUNTING

Archie H. McCallum, Ralph C. Breckenridge, and Jay B. Case, Peoria, Ill., assignors to Sutliff & Case Co., Inc., Peoria, Ill., a corporation of Illinois Application August 3, 1950, Serial No. 177,542

1 Claim. (Cl. 280—29)

This invention relates to machine supports and particularly to a movable machine base which may be in the form of a truck or dolly so that the machine may be readily moved from one position to another. In accordance with the invention such truck construction is sturdily built as low as possible for positioning the machinery as close to the level for operation as practical as it would be mounted on the floor, as for example, pharmaceutical manufacturing, such as a tablet machine wherein it is desirable to move the machine from one position or room to another during the process of manufacture so that different operations may be conducted under varying conditions as to temperature, humidity, or the like.

It is therefore the principal object of the invention to provide such a movable support or base for such machinery equipment.

Another object is to provide such a base on which the machine and power motor, wiring and the like may be assembled for rendering the machine for immediate operation in any desired location.

Another object is to so mount the equipment on the support that the vibration will be reduced to a minimum for operation with even less vibration than if the machine were permanently mounted on the floor.

Another object is to provide such a movable support with elevated wheel mountings so that relatively large supporting wheels and casters may be employed, and likewise to provide elevated section for the mounting of a floor truck lock so that when moved to the desired position the support or base may be locked in position.

It will be noted that the objects of the invention are to meet certain problems arising in the factory wherein it has been found essential to move what has heretofore been considered stationary machinery equipment as will be apparent.

Other objects and advantages of the invention will appear in the following description and illustrated in the accompanying drawings which disclose a highly satisfactory specific embodiment of the invention.

In the drawings:

Fig. 1 is a perspective view of a machine support with fragmentary portions of machinery assembled thereon in accordance with our invention.

Fig. 2 is another perspective view of the machine support alone, the support having been turned to show the caster end thereof and the floor truck lock.

Fig. 3 is a plan view of the machine support.

Fig. 4 is a bottom plan view thereof.

Fig. 5 is a vertical sectional view taken on line 5—5 of Fig. 3.

Fig. 6 is a vertical sectional view taken on line 6—6 of Fig. 3.

Fig. 7 is a detail perspective view of one of the wheel mounting corner elements.

In accordance with our invention, as shown in Fig. 1, a machine 10 of the general type heretofore referred to, fragmentary portions only of which are illustrated, and its driving motor 11 are mounted on a movable machine supporting base 12, or truck forming the primary subject matter of this invention. This truck 12 thus provides a mounting for the motor drive 11 and thus makes a permanent unit consisting of the tablet machine 10, motor drive 11 and the truck 12.

It is unnecessary to set forth any details of the machine 10 except to explain that in the specific tablet machine in operation a compressor can operate three machines. It is necessary for him to stand up as he must move from machine to select samples to check the running weight of the tablets and fill the hoppers so a steady flow of granulation will flow. The operating handle for starting and stopping is approximately thirty inches above the floor. The dies and upper punches are about forty inches and the hopper top is about 72 inches. It can readily be seen that with the average workman six inches added to the last two heights could make it more difficult to clean the punches, remove them or fill the hopper. If a mixer approximately forty inches high is mounted on the truck it means lifting the powders an additional two inches. We often screen and grind the material directly into the mixer. Our oscillating grinder will just fit over the top of the mixer when mounted on the truck. This would not be possible if it were mounted on a six inch high truck. The mounting platform 13 of the truck 12 is, by way of example, four inches above the floor level and two inches below the supporting wheel corner offsets 14 and position lock offset 15. We believe that this two inch lowering of the platform below the offsets has additional great advantage in lowering the center of gravity of the machine.

With reference to the details of construction of the truck which has proven highly satisfactory for the purpose of our invention, it will be seen in the detail Figs. 4 to 7 that the mounting platform 13 which is preferably relatively heavy steel plate is mounted on side steel channels 16 and end steel channels 17 and 18 at the rearward and front ends of the truck respectively and has an intermediate steel brace 19 connecting the side channels and under side of the platform.

The side and end channels 16, 17 and 18 terminate short of the corners of the truck and platform 13 is cut away at the corners to receive the wheel supporting corner offsets 14, each of which as individually shown in Fig. 7 comprises a box-like structure having inner flanges 20 which are of a height sufficient to extend from the bottom of the channels and upwardly above the platform (a height of two inches as explained above). These flanges are provided with a top plate 21 having a rounded outer corner 22 and the outer edges of this plate are provided with a depending flange 23 which preferably extends only down to the level of the machinery mounting platform 13, thus leaving the corners of the truck raised so as not to interfere with feet of operators passing around the truck. Top plate 21 is provided with apertures 24 for receiving the wheel or caster mounting bolts 25.

The position lock offset 15 is similar in construction to the wheel supporting corner offsets, comprising an apertured top plate 26, for receiving the position lock retaining bolts 27 and is provided with side and inner depending flanges 23' which engage between inner ends of end channels 18 and the edges of the platform 13 which is cut away to receive this position lock offset.

For the particular purpose the platform is quarter inch steel plate, side and end channels are 2 x 4 inches of quarter inch steel, the cross brace ⅜ x 2" steel, the corner offsets of quarter inch steel plate and the position lock offset ⅜" steel plate. These parts are welded along all engaging edges to provide a rigid structure.

In the wheel supporting corner offsets 14, at the front end are mounted swivel casters 28 and at the rear end stationary casters 29 and between the swivel casters at the front end, in the position lock offset 15 is mounted a position lock 30. This position lock 30, as illustrated, is of preferably the same general type as shown in the Bassick patent to W. F. Herold 2,421,328 of May 27, 1947 and it is therefore not necessary to describe it in detail. A particular feature however resides in the arrangement of the position lock 15 between the two swivel casters 28 at the front end of the truck which affords a more positive locking of the truck in position so that the machine may be operated to better advantage in any desired position where it is so set. The position lock prevents the unit from traveling due to vibration and has the particular advantage just referred to in such localities as described.

Referring again to Fig. 1 it will be seen that the space between the corner offsets 14 at the rear of the truck provides for the mounting of adjusting skids 31 for driving motor 11 and the main space on platform 13 provides for the mounting of machine 10 by means of bolts 32 and preferably a sound insulating pad 33 is positioned under the base of machine 10. This, and the hard rubber casters, have been found to eliminate about half the noise of operation and has substantially absorbed the vibration of the machine. This saves the wear and tear on the machine and the building.

In the specific construction of the truck in accordance with our invention it will be seen further that the corner offsets for casters and center offset for the position lock permits the machine to be mounted several inches lower thus lowering the center of gravity substantially. This also makes the machine accessible for servicing.

The fact that the organization of the truck, tablet machine and motor elements is portable affords the machine an adaptability which has not been possible heretofore. It permits the machine to be removed from the production line for service and maintenance. It is possible to remove the machines to other rooms of controlled humidity and temperatures when necessary. This also permits a flexibility of floor plan without the necessity of having to contend with permanent mountings. The portability results in saving a considerable number of man hours in plant operation. The machine may be backed up to the wall since due to its portability it is not necessary to leave space for servicing and maintenance.

For the portable organization of truck, machine and motor, a plug and cord connected with the driving motor permits the machine to be operated any place that plug outlets are available. Permanent electrical wiring is not necessary.

In the truck the raised offsets and support which are welded instead of bolted cuts down on the weight of the truck and adds to the supporting strength of it as well as lowering the center of gravity of the unit including the machine and motor mounted on the truck.

We claim:

A movable machine mounting comprising a substantially horizontal platform having its corners and an intermediate portion of the front end cut away, channel members mounted under the side and end portions of said platform between said cut away portions, a central reinforcing brace across the under side of said platform between the channels at the sides of the platform, boxlike mounting offset members in said cut away portions of the platform with ends of the channel members abutting sides of the offset members and the upper parts of the offset members extending above said platform, all said elements permanently connected along abutting edges of engagement with each other, wheels having stationary axes mounted in the corner offset members at the rear end of the platform, casters mounted in the corner offset members of the front end thereof, and a truck positioning lock mounted in the offset member mounted in the front end of the platform.

ARCHIE H. McCALLUM.
RALPH C. BRECKENRIDGE.
JAY B. CASE.

REFERENCES CITED

The following references are of record in the file of this patent:

UNITED STATES PATENTS

| Number | Name | Date |
|---|---|---|
| 1,715,403 | Young | June 4, 1929 |
| 1,823,526 | Breeden | Sept. 15, 1931 |
| 1,864,305 | Holmes | June 21, 1932 |
| 2,360,874 | Herold | Oct. 24, 1944 |
| 2,421,328 | Herold | May 27, 1947 |